March 16, 1965     L. PÉRAS     3,173,717
BUMPERS OF VEHICLES
Filed Jan. 8, 1962     5 Sheets-Sheet 1
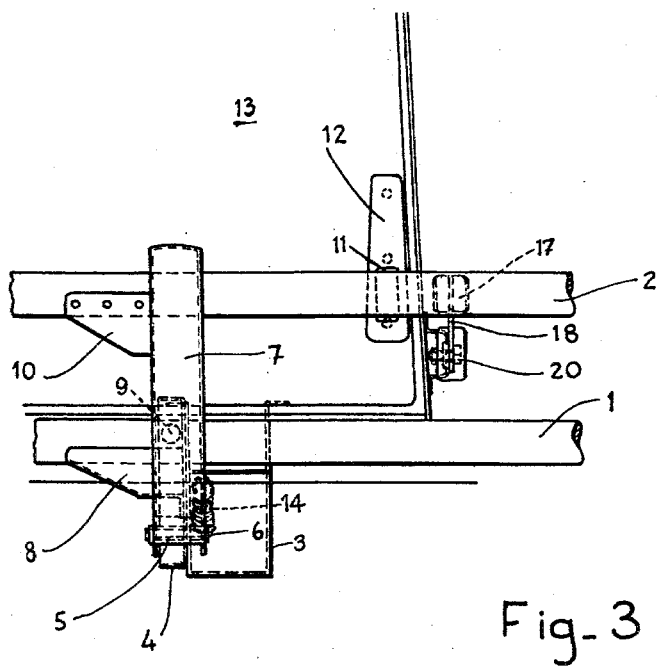
Fig_1
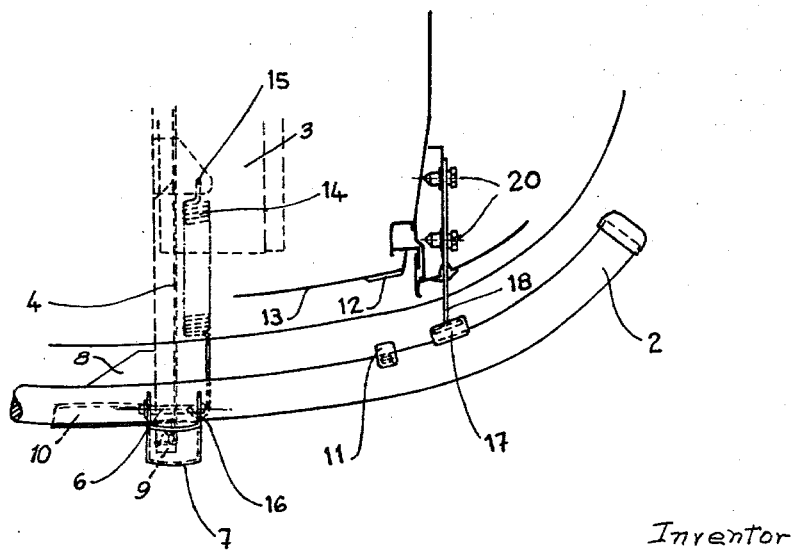
Fig_3
Inventor
Lucien Péras
By Stevens Davis Miller & Mosher
Attorneys March 16, 1965  L. PÉRAS  3,173,717
BUMPERS OF VEHICLES
Filed Jan. 8, 1962  5 Sheets-Sheet 2

Inventor
Lucien Peras
By Stevens Davis Miller & Mosher
Attorneys

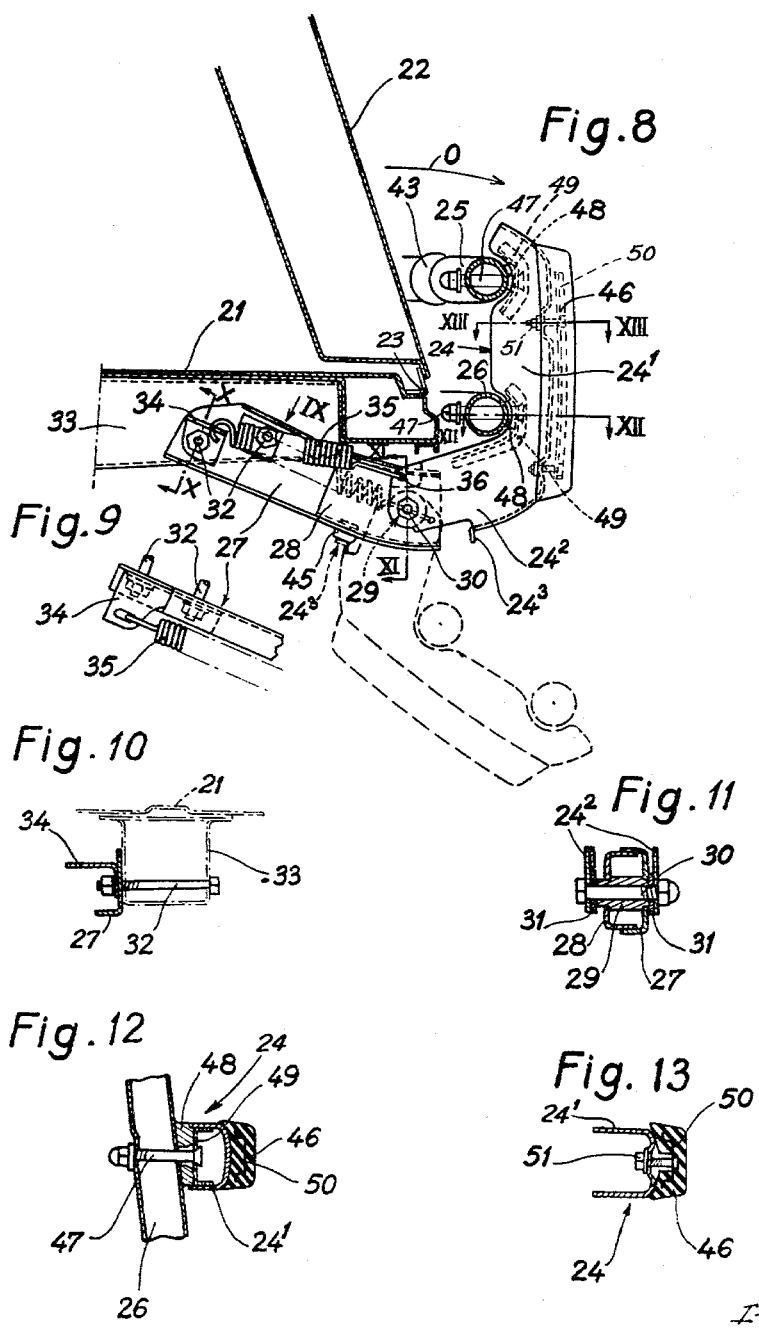

March 16, 1965    L. PÉRAS    3,173,717
BUMPERS OF VEHICLES
Filed Jan. 8, 1962    5 Sheets-Sheet 5

INVENTOR
LUCIEN PERAS
By
Stevens, Davis, Miller & Mosher
ATTORNEYS 3,173,717
BUMPERS OF VEHICLES
Lucien Péras, Billancourt, France, assignor to Regie
Nationale des Usines Renault, Billancourt, Seine,
France
Filed Jan. 8, 1962, Ser. No. 164,722
Claims priority, application France, Jan. 11, 1961, 849,388,
Patent 1,285,364; Nov. 15, 1961, 879,023, Patent
80,671
5 Claims. (Cl. 293—73)

This invention relates to bumpers of vehicles and has specific reference to improvements in devices of this character whereby, in certain cases, part or the whole of the component elements of the bumpers can be tilted down in order to facilitate the access to the interior of the body.

Designers of certain very low modern cars have been led, with a view either to protect the coachwork or body against shocks from bumpers of other vehicles or to comply with certain regulations, to position the bumpers above the floor level of the vehicle, notably in commercial transport or delivery vans or trucks.

This arrangement is attended by certain inconveniences, notably when it is desired to have an easy access to the floor level of the vehicle. In fact, in this case the bumper constitutes an obstacle both to the passage of the various articles to be loaded and to the operation of the doors or lid closing the loading aperture.

In the arrangement constituting the subject-matter of this invention the elements or bars constituting part or the whole of the bumper structure are hingedly mounted on supports rigid with the frame or body of the vehicle. Moreover, adequate stops are provided for keeping these elements in the operative position and in the tilted or folded position.

In order to afford a clearer understanding of this invention two typical embodiments thereof will now be described with reference to the accompanying drawings illustrating the application of the invention to the back of the vehicle provided with a door or lid having horizontal hinges. In the drawings:

FIGURE 1 is a fragmentary elevational view showing the mounting of a bumper according to this invention as seen from the rear of the vehicle;

FIGURE 3 is a plan view from above of the same mounting;

FIGURE 8 is a cross-sectional view of the same bumper, as seen from the left-hand side of FIG. 6;

FIGURE 9 is a detail view taken in the direction of the arrow IX of FIG. 8;

FIGURE 10 is a section taken upon the line X—X of FIG. 8;

FIGURES 11, 12 and 13 are respectively detail sectional views taken upon the lines, XI—XI, XII—XII and XIII—XIII of FIG. 8.

Figure 2:
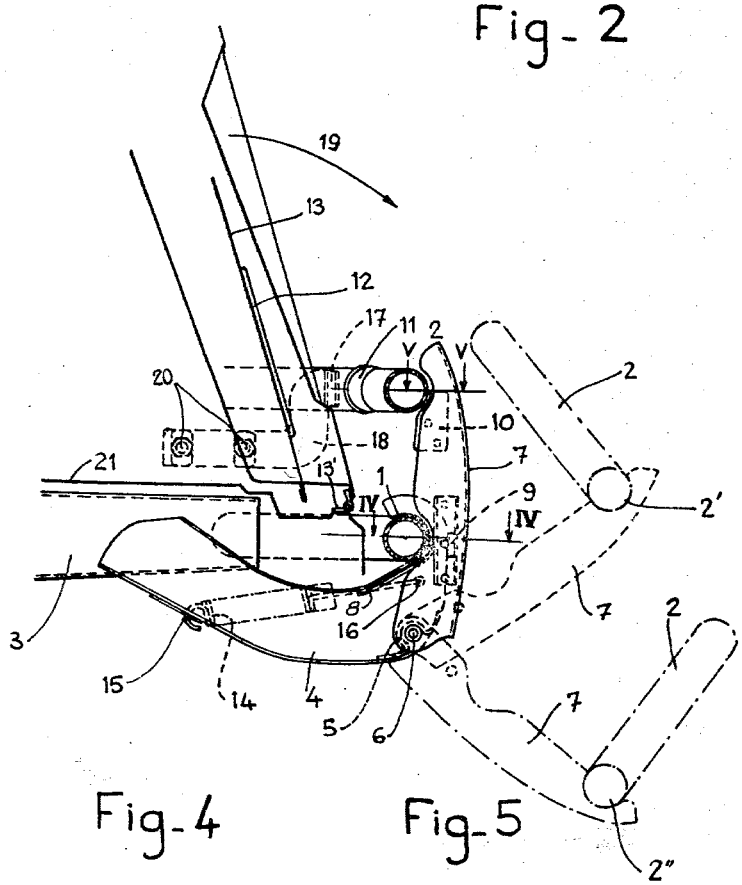
FIGURE 2 is a side elevational and part-sectional view of the bumper of FIG. 1.
Figures 4, 5:
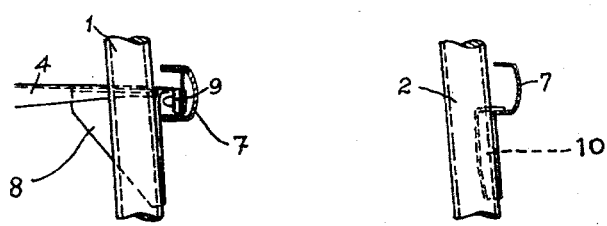
FIGURES 4 and 5 are sections taken along the lines IV—IV and V—V of FIG. 2.
Figure 6:
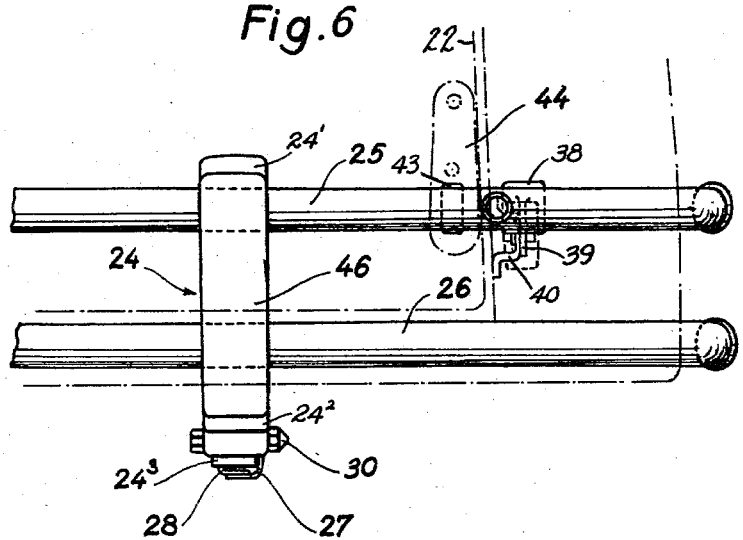
FIGURE 6 is a part-elevational view showing another bumper in its operative position, as seen from the rear of the vehicle.
Figure 7:
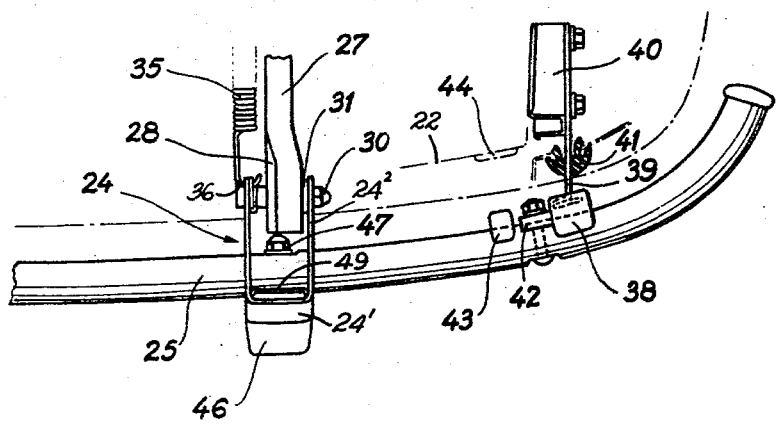
FIGURE 7 is a fragmentary plan view from above of the same bumper.
Figure 14:
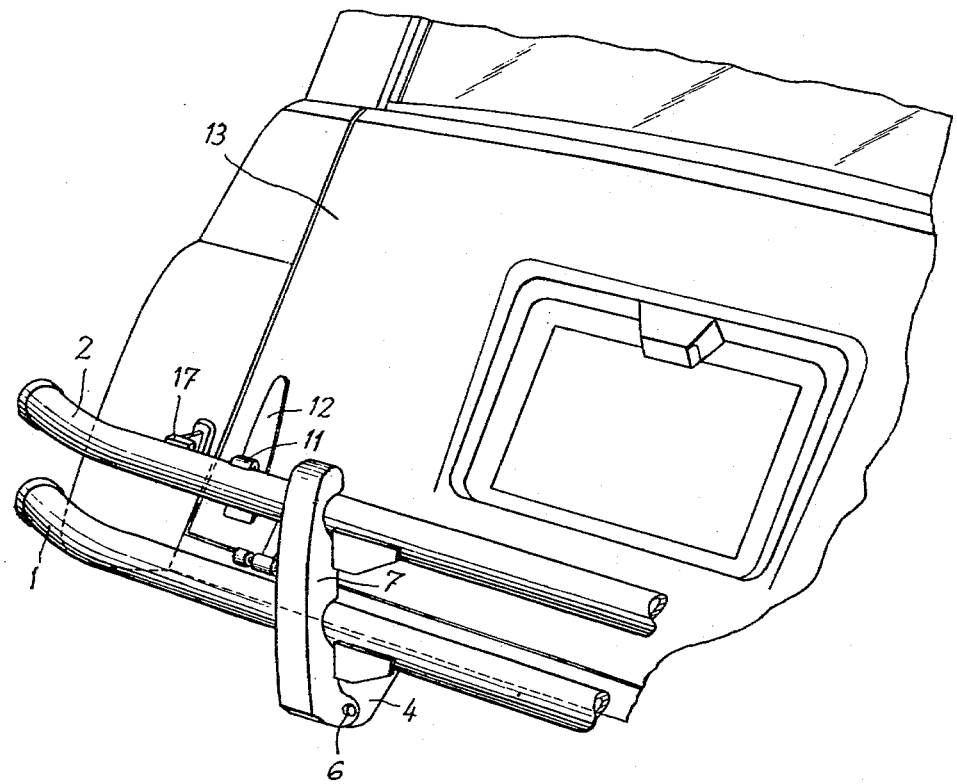
FIGURE 14 is a perspective view of the left-rear part of the body portion of a vehicle equipped with the bumper.

Referring first to FIGS. 1 to 5 of the drawings, it will be seen that:

The bumper of this invention comprises two horizontal parallel elements or bars, that is: the fixed lower element 1 and the folding upper element 2.

The lower element 1 is secured on the chassis frame 3 or to the understructure of the body of the vehicle by means of angle members 4 (FIG. 2) on which it is welded. In the corner of these members 4 a through hole 5 is formed for receiving the pivot or hinge pin 6 of U-sectioned straps 7 (FIG 2) constituting the overriders on which the upper element 2 is secured. The mounting of the lower element 1 on the frame or understructure of the vehicle is completed by the support or bracket 8 consisting of two triangular gusset plates 8 disposed at right angles to each other. In addition, the angle members 4 are provided with rubber pads 9 for a purpose to be defined presently.

The movable element 2 of the bumper is rigidly assembled with the strap 7 by means of a support 10 on which they are both bolted or welded. A pair of crescent-shaped shoes 11 of nylon or other suitable material having a low coefficient of friction are secured by screwing or otherwise on the upper bumper element 2, symmetrically in relation to the longitudinal centre line of the vehicle, and in the same vertical planes as those of another pair of elongated shoes 12 of same material which are secured on the lower door or closure means 13. A traction spring 14 has one end secured at 15 to the support member 4 and the other end anchored at 16 on the strap 7. Finally, this mounting is completed by a rubber pad 17 secured on a support 18 bolted on the vehicle body at 20.

This device operates as follows:

In the normal or operative position, the door or lid 13 being closed, the upper movable element 2 of the bumper is in the position shown in unbroken lines in FIG. 2, the spring 14 urging the movable bumper bar 2 against the upper rubber pad 17 and the strap 7 against the lower pad 9.

When the cover, door or lid 13 is opened by tilting same about its hinges 13' in the direction of the arrow 19, the elongated nylon shoes 12 engage the crescent-shaped shoes 11 of element 2 and slide thereon so as to cause the straps 7 and therefore the movable element 2 to tilt backwards about the pivot pins 6 in the direction of the arrow 19. When the element 2 is in position 2' (FIG. 2), the traction springs 14 pull the straps 7 downward to position 2" in which they are kept by the overcentre action of said springs, the straps abutting against the lower portion of supports 4. Thus, free access to the floor 21 may be had, and if desired the door or lid 13 may be disengaged from its hinges and removed from the vehicle to facilitate the loading or unloading of the latter.

To restore the assembly to its normal condition, the operator simply tilts manually the movable element 2 of the bumper to its upper position, after having refitted or reclosed the door or cover 13.

The alternate embodiment of the invention which is illustrated in FIGS. 6 to 13 of the drawings is also mounted at the back of the vehicle having a floor 21 and a door or lid 22 hingedly mounted on the vehicle body by means of pins 25.

This bumper comprises two stepped tubular bars 25, 26 extending horizontally in planes ensuring a suitable protection of the back of the vehicle, these bars being secured on a pair of angle members 24 of which only one is visible in the drawings.

These bars are secured on an arm $24^1$ of each angle member, the other fork-shaped arm $24^2$ of this member extending under the floor of the vehicle where it is pivotally mounted adjacent to its end. This pivotal mounting consists in this case of a support or bracket comprising essentially a U-sectioned arm 27 reinforced by an opposite U-sectioned member 28 fitting in the arm 27, a tubular distance-piece 29 being interposed between these elements and receiving in its bore the pivot pin 30.

This pivot pin consists preferably of a bolt clamping the fork constituted by the arm 24², suitable washers 31 being disposed at either ends of the distance-piece.

Each mounting support or bracket is secured by bolts 32 on a longitudinal member 33 of the vehicle underframe or understructure (see FIGS. 9 and 10). Also secured on this support is a lug 34 for anchoring one end of a traction spring 35 having its other end attached to an orifice 36 formed in the arm 24² of the angle member which is suitably reinforced at this location. This spring 35 is adapted notably to urge the bumper, in relation to its mounting supports, to its normal operative position on the vehicle.

There is provided on either side of the vehicle (see FIG. 7), for engagement by the upper bar 25, a shock-absorber pad 38 of resilient material having its support 39 bolted on a fixed member 40 disposed internally of the body and through which said support 39 extends, a suitable rubber bushing 41 being interposed therebetween as shown.

Moreover, a wedge member 42 is secured on the upper bar 25 and operatively associated with each shock-absorber pad 38, these wedge members 42 being positioned with a view to co-act with the registering side faces of pads 38 along planes converging toward the longitudinal centre line of the vehicle in order properly to wedge the shock-absorber in its normal operative position. The upper bar 25 also carries pads 43 corresponding to elongated pads 44 secured on the door or lid 22 so that when the latter is folded down in the direction of the arrow O (FIG. 8) the simultaneous lowering of the bumper is permitted by sliding contact.

However, outside this specific application in the case of a door or lid having horizontal hinges 23 (which may be detachable is desired) the bumper illustrated in FIGS. 6 to 13 can also be tilted down to a position in which the back of the vehicle is freed completely at floor level, the stability of the bumper in this position being maintained by the traction springs 35. This position is illustrated in broken lines in FIG. 8 wherein the arm 24² of the U-sectioned angle support 24 has disposed between the prongs of its fork a lug 24³ so shaped and positioned as to engage the resilient pad 45 secured under the mounting support, while the point of anchorage of spring 35 on arm 24² is so positioned that this spring cannot apply any torque to the member 24 in relation to the pivot pin 30 or only a light torque in a direction opposite to that exerted by the same spring in the normal operative position of the bumper.

The angle supports 24 carrying the bars 25, 26 on their inner face may be provided on their outer faces with resilient overriders or guards 46.

FIGS. 12 and 13 illustrate the mounting of bars 25, 26 with the overriders 46 on the angle supports 24. These bars 25, 26 are secured respectively on each support 24 by means of a bolt 47 with the interposition of a bearing member 48 through which said bolt extends, the bolt head being assembled with a distance-piece or spacer 49 secured between the wings or flanges of arm 24¹.

Moreover, each overrider has embedded therein a metal reinforcement 50 carrying at two spaced points of the overrider a bolt shank 51 to permit a direct mounting on the support 24. If desired, these resilient overriders may be cemented on the supports 24.

Of course, it would not constitute a departure from the basic principle of this invention to mount bumpers of this type on any other type of back doors or lids, or to mount the same bumpers on the front end of the vehicle for example with a view to facilitate the access to an aperture or to the engine compartment.

While the present invention has been described with specific reference to two preferred embodiments thereof, it will be readily understood by anybody conversant with the art that many modifications and variations may be brought thereto without departing from the spirit and scope of the invention as set forth in the appended claims.

I claim:

1. In a road vehicle having a frame, a body portion mounted on said frame and having an opening therein, closure means hingedly mounted on said body portion for closing and gaining access through said opening, a bumper device disposed in front of and completely across said closure means to protect same, said bumper device comprising, bar means extending above said closure means in the path of opening thereof when in a vertical operating position confronting said closure means, means for pivotally connecting said bar means to said frame so that upon opening said closure means said bar means is movable from said vertical operating position to a substantially horizontal position out of the path of movement of the closure means, spring means disposed between said frame and said connecting means and arranged with respect to the pivotal connection of said connecting means so as to urge said bar means into one or the other of said positions, and stop means mounted on said body portion adjacent said closure means against which said bar means engages when in said vertical operating position, and shoe means disposed on said closure means and said bar means opposite one another, said shoe means engaging each other upon said closure means being moved to the access position to move said bar means from the vertical operating position to the other position.

2. In a road vehicle according to claim 1 wherein wedge means are mounted on said bar means opposite said stop means which are adapted to cooperate with said stop means when said bar means is in said vertical operating position to center and wedge said bar means thereat.

3. In a road vehicle according to claim 1 wherein said bar means include upper and lower bar members parallelly spaced with respect to each other, support means for stationarily mounting said lower bar member to said frame while said upper bar member is pivotally connected by said connecting means to said support means.

4. In a road vehicle according to claim 1 wherein said bar means include upper and lower bar members parallelly spaced with respect to each other and mounted on said connecting means.

5. In a road vehicle according to claim 1 wherein additional stop means are disposed on said connecting means which engage said frame when said bar means is in said horizontal position so as to limit this position.

References Cited by the Examiner
UNITED STATES PATENTS

| | | | |
|---|---|---|---|
| 1,259,523 | 3/19 | Kawasaki | 293—36 X |
| 2,179,163 | 11/39 | Roth | 293—42 |
| 2,610,083 | 9/52 | Keller | 296—106 X |
| 2,617,674 | 11/52 | Roth | 293—36 |
| 2,796,287 | 6/57 | Moyes | 293—69 X |
| 2,954,255 | 9/60 | Bates | 293—73 X |
| 2,990,212 | 6/61 | Nicastro | 293—34 |

LEO QUACKENBUSH, *Primary Examiner.*